United States Patent Office 3,230,185
Patented Jan. 18, 1966

3,230,185
PREPARATION OF CELLULAR POLYURETHANES
Horst Kopnick, Cologne-Stammheim, Manfred Dahm, Leverkusen, and Detlef Delfs, Opladen, Germany, assignors to Farbenfabriken Bayer Aktiengesellschaft, Leverkusen, Germany, a German corporation
No Drawing. Filed May 2, 1962, Ser. No. 191,744
Claims priority, application Germany, May 6, 1961, F 33,876
7 Claims. (Cl. 260—2.5)

This invention relates generally to the preparation of polyurethane plastics, and more particularly to an improved method of preparing cellular polyurethanes.

Cellular polyurethanes, or in other words, polyurethane foams, have been prepared heretofore by the reaction between a resinous material such as a polyester or polyalkylene ether having terminal hydroxyl groups and water with an organic polyisocyanate. The polyester or polyalkylene ether reacts with the polyisocyanate to form addition products of greater molecular weight and the water reacts with isocyanate groups to form carbon dioxide. As chain lengthening occurs, the reaction mixture becomes more and more viscous and finally solidifies into a polyurethane plastic. The carbon dioxide formed during the reaction becomes entrapped in the viscous reaction mixture and causes the formation of pores or cells in the solidified product.

In the original commercial process for making polyurethane foams, a polyester, polyisocyanate, water and catalyst were all mixed together at substantially the same time. It became apparent as the technology continued to develop that polyurethane foams having improved characteristics could be prepared from polyalkylene ether glycols instead of polyesters. It was found, however, that if the components of a reaction mixture are mixed together substantially simultaneously, the reaction mixture collapses after expansion but before solidification. Consequently, the earlier commercially important processes for making polyurethane foams from polyalkylene ether glycols were two-step processes in which the polyalkylene ether glycol was reacted under substantially anhydrous conditions in a first step with an organic polyisocyanate to form a prepolymer and this prepolymer and excess organic polyisocyanate were then reacted in a second step with water to form the polyurethane foam.

It was later determined that a polyurethane foam could be made from a polyalkylene ether glycol in a one-step process provided a proper catalyst and a suitable stabilizing agent were included in the reaction mixture. The conventional silicone oils used as stabilizers in the preparation of polyurethane foams from polyesters are not suitable for stabilizing a polyurethane foam made from polyalkylene ether glycols against collapse prior to solidification. Such silicone oils are dialkyl siloxanes and have been disclosed for use in polyester foams in French Patent 1,153,994. It has also been proposed to use a siloxane oxyalkylene block copolymer of the type disclosed in U.S. Patent 2,834,748, for stabilizing polyurethane foams prepared from polyalkylene ether glycols. Although the siloxane oxyalkylene block copolymers are an improvement over the dialkyl siloxanes, they have the disadvantage of requiring relatively close adherence to set formulations which introduces an inconvenience in commercial production and makes it difficult to repeatedly produce foams having the same physical characteristics.

It has also been proposed heretofore in copending U.S. application Serial No. 77,018 by Horst Kopnick, Gunther Loew and Detlef Delfs to use certain organosiloxymethyl alkanes to improve the stabilization of the foam over the aforementioned siloxyalkylene block copolymers. These organosiloxymethyl alkanes, while they are superior to the oxyalkylene block copolymers, suffer from the disadvantage that they are not entirely stable to chemicals and hydrolysis. This is important when it is considered that these compounds are used in the manufacture of foam plastics wherein water and other auxiliary agents are used.

It is therefore an object of this invention to provide an improved method for stabilizing polyurethane foams. Another object of the invention is to provide a method for making polyurethane foams which permits larger variation in formulation than the heretofore available processes. Still another object of the invention is to provide a method for making polyurethane foams which is particularly well-suited for making polyurethane foams from polyalkylene ethers having terminal hydroxyl groups. A more specific object of the invention is to provide an improved method of preventing a polyurethane foam reaction mixture from collapsing prior to solidification into a polyurethane foam. A further object of this invention is to provide a method of stabilizing polyurethane foams wherein the stabilizing agent is stable to chemicals and hydrolysis.

The foregoing objects and others which will become apparent from the following description are accomplished in accordance with this invention, generally speaking, by providing a method of making a polyurethane foam wherein an organic compound having at least two reactive hydrogen atoms, a molecular weight of at least about 500, a hydroxyl number of not more than about 225 and an acid number of not more than about 10 is reacted with an organic polyisocyanate in a reaction mixture containing an inert gas and an organosiloxymethyl alkane having the formula $$[R(O\!-\!CH_2\!-\!CHR')_x \quad O(Si(CH_3)_2\!-\!O)_y \\ CHR'\!-\!CHR'\!-\!O\!-\!CH_2\!-\!]_n CR''_{4-n}$$

or

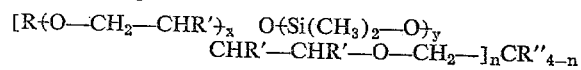

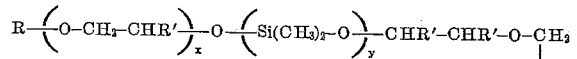

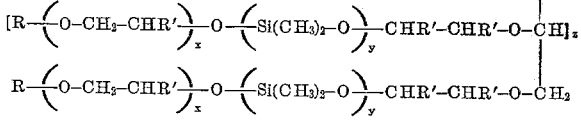

wherein R is a monovalent lower alkyl radical having from 1 to 5 carbon atoms, R' and R'' represent hydrogen atoms or monovalent lower alkyl radicals having 1 to 5 carbon atoms, $x$ is a whole number greater than 2, $z$ is a whole number including 0 of from 0 to 6 and $n$ is 3 or 4.

The addition of the organosiloxyalkyl ethers in accordance with this invention considerably desensitizes the foam plastic, thereby making the manufacture more reliable. It also allows for greater deviations in the various compositions of the reaction component; normally, even slight deviations from the prescribed quantities in the reaction mixture may lead to technically useless foam products. In addition, the new additives lead to a much greater stability of the reaction mixture. This is found in particular in the manufacture of foam plastics from polyethers, polyisocyanates and water in a single step process which has been heretofore very difficult because the normally used catalysts were not able to coordinate satisfactorily the simultaneous reaction of the hydroxyl groups of the polyether with the polyisocyanate and the reaction of the water with the polyisocyanate, thus causing the breaking down of the foam plastics before hardening could take place. The normal silicone oils were not able to prevent this break-down whereas the organosiloxyalkyl ethers in accordance with this invention are so effective that foam plastics based on polyethers are easily produced in a one-step process. Further, as stated previously, these compounds are more stable to the action of chemicals and hydrolysis and, therefore, are not chemically changed before the stabilization effect is obtained.

Although the invention is most important in the preparation of polyurethane foams from a polyalkylene ether having at least two alcoholic hydroxyl groups, it is equally applicable for the stabilization of a foam prepared from any other organic compound having at least two reactive hydrogen atoms with the molecular weight and other characteristics set forth above. The invention thus contemplates in its broadest aspect a process for stabilizing any polyurethane foam reaction mixture against collapse and is not concerned with the selection of a particular resinous reactant such as, for example, the polyester of polyalkylene ether glycol. The invention is in the nature of an improvement on all existing processes for making polyurethane foams regardless of the type of compound reacted with the polyisocyanate to form the polyurethane. However, because of the difficulty heretofore known in stabilizing reaction mixtures prepared from polyalkylene ethers and polyisocyanates and particularly reaction mixtures prepared from polyalkylene ethers having secondary hydroxyl groups, the invention is most applicable to processes using polyalkylene ethers so those processes are preferred.

Although the heretofore available dialkyl siloxanes will not prevent collapsing of a reaction mixture prepared from a polyalkylene ether glycol having secondary hydroxyl groups, even a trace of the stabilizing agent provided by this invention is of value in the reaction mixture. Hence, in its broadest aspects, the invention contemplates the use of any amount of the stabilizer but it is preferred to use about 0.001% to about 10% by weight based on the weight of organic compound having at least two reactive hydrogen atoms such as, a polyalkylene ether glycol. Best results are obtained with from about 0.1% to 5% stabilizer based on the weight of the organic compound having at least two reactive hydrogens. It is important to note that the stabilizer of the invention can be employed in a smaller amount than the siloxane oxyalkylene block copolymers known heretofore. In the usual foam formulation 1–1.5% of the known block copolymers are employed while in the very same foam formulation 0.4 to 1% of the stabilizers of the present invention are fully sufficient.

The organosiloxyalkyl ethers used in accordance with this invention as stabilizing agents can be prepared by any method including, for example, the method described in application U.S. Serial Number 177,961 filed March 9, 1962. The organosiloxyalkyl ethers can be prepared by trans-esterification of an α,ω-dialkoxypolydimethylsiloxane at one end of the siloxane chain with a polyol modified by alkoxylation, for example, 1,2,-bis-(β-hydroxypropoxy)-ethane, 1,1,1 - tri - (β - hydroxypropoxymethyl)-alkane, 1,2,3 - tri - (β-hydroxypropoxy)-propane, tetrakis-(β-hydroxypropoxymethyl)-methane, 1,2,3,4,5,6-hexakis-(β-hydroxypropoxy)-hexane and mixtures thereof and at the other end with a polyalkylene glycol monoalkyl ether. Preferably, the trans-esterification process for preparing the organosiloxyalkyl ethers are quantitative processes at a temperature of from about 50 to about 300° C. The polyalkylene glycol monoalkyl ethers used in the trans-esterification of one end of the α,ω-dialkoxypolydimethylsiloxane may contain several R' radicals in the polyalkylene oxide chain, that is, they may be copolymerized in known manner from several alkylene oxides, for example, by the combination of ethylene oxide, propylene oxide, butylene oxide, styrene oxide and the like. Examples of such compounds include 1,2-di-[β-(n-butoxypolypropoxyethoxypolydimethylsiloxy) - propoxy]-ethane, 1,1,1 - tri - [β-methoxypolyethoxypropoxypolydimethylsiloxy)-propoxymethyl] - propane, 1,2,3-tri-[β-(m-butoxypolyethoxypropoxypolydimethylsiloxy) - propoxy]-propane, 1,1,1-tri-[β-(n-butoxypolyethoxypropoxypolydimethylsiloxy) - propoxymethyl] - propane, 1,2,3,4,5,6-hexajus - [β - (isobutoxypolyethoxypropoxypolydimethylsiloxy)-propoxy]-hexane and the like. Preferably, the organosiloxyalkyl ethers contemplated by this invention have a molecular weight of not more than about 50000 but any compound represented by the above formula which is soluble in at least one of the reactants can be used.

Any organic compound having at least two reactive hydrogen atoms as determined by the Zerewitinoff method described by Kohler in the J. Am. Chem. Soc. 49, 3181 (1927) having the characteristics set forth above can be used in practicing this invention as the resinous component which is reacted with the organic polyisocyanate. In addition, the invention contemplates mixtures of various compounds of this type. For example, any suitable hydroxyl polyester can be used such as, for example, an ester prepared from an aliphatic or aromatic polycarboxylic acid and a polyhydric alcohol. Any polycarboxylic acid can be used in the preparation of the polyester including for example adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol may be used such as, for example, ethylene glycol, propylene glycol, butylene glycol, hexanediol, bis-(hydroxymethylcyclohexane), trimethylol propane, trimethylolethane, hexanetriol, glycerine, pentaerythritol, sorbitol xylylene glycol, p-phenylene di (β-hydroxyethylether), and the like.

The resinous component of the reaction mixture can be any suitable polyalkylene ether having at least two terminal alcoholic hydroxyl groups such as, for example, the condensation product of an alkylene oxide with a small amount of a compound containing reactive hydrogen containing groups including for example, water, ethylene glycol, propylene glycol, butylene glycol, amylene glycol, trimethylolpropane, glycerine, pentaerythritol, hexanetriol, sugar, phenol, hydroquinone, 4,4' - dihydroxydiphenylmethane and the like. Any suitable alkylene oxide may be used in the condensation such as, for example, ethylene oxide, propylene oxide, butylene oxide, amylene oxide, mixtures thereof and the like. Furthermore, tetrahydrofuran can be polymerized to form a suitable polytetramethylene ether glycol. The condensation of the alkylene oxide to form a suitable polyalkylene ether having terminal hydroxyl groups can be prepared by any suitable condensation process such as, for example, by the process described by Wurtz in the "Encyclopedia of Chemical Technology," volume 7, pages 257 to 262, published by Interscience Publishers in 1951. The process described in U.S. Patent 1,922,459 can also be used for making a suitable polyalkylene ether having terminal hydroxyl groups. Suitable polyalkylene ethers can also be prepared from epichlorohydrin or styrene oxide. Condensates of the alkylene oxides with amines such as, for example, ammonia, ethylene diamine, hexamethylene diamine, aniline, or phenylene diamine can also be used.

Any suitable polyesteramide may be used such as, for example, the reaction product of an amine or an amino alcohol with a polycarboxylic acid. Any suitable amine such as, for example, ethylene diamine, propylene diamine, hexamethylene diamine, phenylene diamine and the like may be used. Any suitable amino alcohol such as, for example, ethanolamine, 3-aminopropanol and the like may be used. Any of the polycarboxylic acids set forth above with relation to the preparation of hydroxyl polyesters may be used in the preparation of polyesteramides. The polyesteramides may also be prepared by reaction dioldiamides such as, for example, the reaction product of adipic acid and diethanolamine and terephthalic acid-bis-propanolamide with dicarboxylic acids.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(β-hydroxyethyl) phenylene dithioether, and the like. Examples of suitable polyhydric polythioethers which may be used in the method of this invention are set forth in U.S. Patents 2,862,972 and 2,900,368.

Any suitable polyacetal may be used such as, for example, the reaction product of an aldehyde with a polyhydric alcohol. Any suitable aldehyde may be used such as, for example, formaldehyde, paraldehyde, butyraldehyde, and the like. Any of the polyhydric alcohols mentioned above with relation to the preparation of hydroxyl polyesters may be used.

The various polyhydroxy compounds may be used in admixtures and low molecular weight substances such as the above-mentioned alcohols may also be added. The polyhydroxy compounds should have an —OH equivalent between 100 and 3,000. The —OH equivalent is defined as the quantity of polyhydroxy and polycarboxyl compounds in grams which contains one mol of functional groups.

Any suitable organic polyisocyanate man be utilized in the process of this invention such as, for example, aliphatic polyisocyanates, aromatic polyisocyanates, alicyclic polyisocyanates and heterocyclic polyisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4' - diisocyanate, dichlorohexamethylene diisocyanate, tetramethylene diisocyanate, pentamethylene diisocyanate, hexamethylene diisocyanate, 1-chlorobenzene-2,4-diisocyanate, 4,4',4''-triisocyanato triphenylmethane, 1,3,5-triisocyanato benzene, 2,4,6-triisocyanato toluene, 4,4'-dimethyl diphenylmethane-2,2',5,5'-tetraisocyanate, furfurylidene diisocyanate and the like. Of various polyisocyanates which can be used, best results are obtained with toluylene diisocyanate and particularly with an isomeric mixture of 80% 2,4-toluylene diisocyanate and 20% 2,6-toluylene diisocyanate so the toluylene diisocyanates are preferred.

Further, the addition products of any of the above-mentioned polyisocyanates with polyfunctional hydroxy compounds and the polyisocyanates set forth in German patent specifications 1,022,785 and 1,027,394 may be used.

Polyurethane foams can be prepared in accordance with this invention by the conventional manipulative steps. For example, the organic compound having at least two reactive hydrogen atoms, the organic polyisocyanate, the blowing agent, catalysts, emulsifiers and other components of the reaction mixture along with the organosiloxyalkyl ethers can all be mixed together substantially simultaneously. An apparatus particularly well-suited for affecting the mixture of the components for foaming the reaction mixture is described in Re. Patent 24,514. Although it is preferred to use compounds having terminal alcoholic hydroxyl groups, the invention contemplates compounds having terminal carboxyl groups and if the resinous components contain a large number of carboxyl groups, it is not always necessary to add water to the reaction mixture. Further, in either event, blowing agents other than water can be used for example, halogenated hydrocarbons such as, for example, trichlorofluoromethane, dichlorodifluoromethane, dichlorofluoromethane, dichlorofluoroethane, difluorobromomethane, difluorodibromoethane, difluorodichloroethane and the like.

Any suitable catalyst such as, for example, a tertiary amino or an organo metallic compound can be used. For example, the tertiary amine can be dimethyl benzyl amine; an N-alkyl morpholine, including N-ethyl morpholine, N-methyl morpholine, and the like; an N,N'-diakyl piperazine including N,N'-diethyl piperazine, N,N'-dipropyl piperazine, and the like; N,N'-endoethylene piperazine; 1-alkoxy-3-dimethyl amino propane including 1-methoxy-3-dimethyl amino propane and the like; alkalis including sodium hydroxide, alkali metal phenolates including sodium phenolate, alkali metal alcoholates such as sodium octylate, alkali earth metal oxides including calcium oxide; and salts of amines and organic acids including diethyl amino oleate; tin compounds including stannous oleate, stannous octoate, dibutyl tin dilaurate, dibutyl tin di(2-ethyl hexoate), and the like, or any other metal catalysts disclosed in U.S. application Serial No. 678,437, filed August 8, 1957 and in U.S. Patent 2,916,464.

Any suitable emulsifier can be used along with the organosiloxymethyl alkane in accordance with this invention such as, for example, sulphonated castor oil. Various other additives including paraffin oils and nitrogen free silicone oils can be added to regulate the pore size of the foam. Likewise, fillers, dye stuffs and plasticizers can be used, if desired. As already pointed out the siloxane oxyalkylene block copolymers have the disadvantage of requiring relatively close adherence to said formulations. The stabilizers of the present invention, however, allow for a broader spectrum of amounts to be added to a specific set formulation without spoiling the product. Furthermore, a much smaller amount of the stabilizer of the present invention has the very same effect as compared with the known block copolymers. Another important advantage over the known block copolymers resides in the better resistance against hydrolytic influence which is shown by the stabilizers of the invention. Better stability against hydrolysis is an important feature in that in practice the stabilizer is premixed with the activator and the water as a so-called activator mixture which now can be easier handled and stored.

The invention is further illustrated but not limited by the following examples in which parts are by weight unless otherwise specified.

*Example 1*

About 100.0 parts of a weakly branched polypropylene glycol having an —OH number of 56, about 4.10 parts of toluylene diisocyanate, about 2.9 parts of water, about 0.05 part of dibutyl tin dilaurate, about 0.25 part of endoethylenepiperazine and about 1.0 part of 1,2-di[β-(n-butoxypolypropoxyethoxypolydimethylsiloxy) - propoxy]-ethane are mechanically mixed intensively for a short time and the mixture is cast into molds. The foam plastic formed from the liquid reaction mixture has the following mechanical properties:

Weight per unit volume _____ kg./m.$^3$__ 34
Tensile strength according to
  DIN 53 572 _____ kg./cm.$^2$__ 1.1
Elongation at break according to
  DIN 53 572 _____percent__ 215
Compression strength at 40%
  compression _____ g./cm.$^2$__ 37
Impact elasticity according to
  DIN 53 573 _____percent__ 51
Permanent deformation according to
  DIN 53 572 _____ do__ 6

A plastic foam prepared for comparison without the addition of the silicon compound does not give a stable product and collapses after a short time.

*Example 2*

About 100.0 parts of a weakly branched polypropylene glycol of —OH number 56, about 41.0 parts of toluylene diisocyanate, about 2.9 parts of water, about 0.05 part of dibutyl tin dilaurate, about 0.25 part of endoethylenepiperazine and about 0.7 part of 1,1,1-tri-β-(methoxypolyethoxypropoxypolydimethylsiloxy) - propoxymethyl] propane are mixed mechanically for a short time and intensively and the mixture is cast into a mold. The resulting foam has the following physical properties:

| | |
|---|---|
| Weight per unit volume kg./m.$^3$ | 30 |
| Tensile strength according to DIN 53 572 kg./cm.$^2$ | 1.0 |
| Elongation at break according to DIN 53 572 percent | 330 |
| Compression strength at 40% compression g./cm.$^2$ | 30 |
| Impact elasticity according to DIN 53 573 percent | 47 |
| Permanent deformation according to DIN 53 572 do | 10 |

A foam prepared for comparison without the addition of the silicon compound does not give a stable plastic foam and soon collapses.

*Example 3*

About 100.0 parts of a weakly branched polypropylene glycol of OH number 56, about 0.25 part of endoethylenepiperazine, about 0.05 part of dibutyl tin dilaurate and about 1.0 part of a mixture of equal parts of 1,2,3-tri-[β-m-butoxypolyethoxypropoxypolydimethylsiloxy) - propoxy]-propane and 1,1,1-tri-[β-(n-butoxy polyethoxypropoxypolydimethylsiloxy)-propoxymethyl] - propane are homogenized and introduced into the injection mixing chamber of an apparatus provided with nozzles, such as that disclosed in U.S. Re. 24,514 into which about 2.9 parts of water and about 41 parts of toluylene diisocyanate are also injected. After leaving the mixing chamber, the liquid foaming mixture is cast cast into molds. The resulting foam has the following mechanical properties:

| | |
|---|---|
| Weight per unit volume kg./m.$^3$ | 34 |
| Tensile strength according to DIN 53 572 kg./cm.$^2$ | 0.9 |
| Elongation at break according to DIN 53 572 percent | 280 |
| Compression strength at 40% compression g./cm.$^2$ | 33 |
| Impact elasticity according to DIN 53 573 percent | 48 |
| Permanent deformation according to DIN 53 572 do | 8 |

A foam prepared for comparison without addition of the silicon compound does not yield a stable product and soon collapses.

*Example 4*

About 100.0 parts of a weakly branched polypropylene glycol with an —OH number of 56 and about 41.0 parts of toluylene diisocyanate are intimately mixed and added to about 0.05 part of dibutyl tin dilaurate and about 1.0 part of 1,2,3,4,5,6-hexajus-[β-(isobutoxypolyethoxypropoxypolydimethylsiloxy)-propoxy]-hexane. After adding a solution of 0.25 part of endoethylenepiperazine and about 2.9 parts of water, the solution becomes turbid after a short time and a polyurethane foam plastic with the following physical properties is obtained:

| | |
|---|---|
| Weight per unit volume kg./m.$^3$ | 31 |
| Elongation at break according to DIN 53 572 percent | 260 |
| Tensile strength according to DIN 53 572 kg./cm.$^2$ | 0.9 |
| Compression strength at 40% compression g./cm.$^2$ | 33 |
| Impact elasticity according to DIN 53 572 percent | 48 |
| Permanent deformation according to DIN 53 572 do | 10 |

A comparable foam without the addition of the silicon compound does not yield a stable foam plastic but soon collapses.

It is to be understood that any other resinous component, organic polyisocyanate, accelerator or catalyst, emulsifying agent or other components set forth above if suitable in the process in accordance with this invention can be substituted in the foregoing examples if desired. It is further pointed out that any organosiloxyalkyl ether within the general formulas set forth above may be used in the working examples for those specifically used therein.

Although the invention has been described in considerable detail in the foregoing for the purpose of illustration, it is to be understood that such detail is solely for the purpose of illustration and that variations may be made by those skilled in the art without departing from the spirit of the invention and scope of the claims.

What is claimed is:

1. In the preparation of a polyurethane foam by a process wherein an organic polyisocyanate is reacted in a reaction mixture containing a blowing agent with an organic compound having at least two reactive hydrogen atoms which are reactive with an —NCO group, said organic compound having a molecular weight of at least about 500, the improvement which comprises affecting the said reaction while the components are in admixture with a compound having the formula selected from the group consisting of:

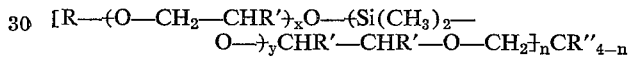

or

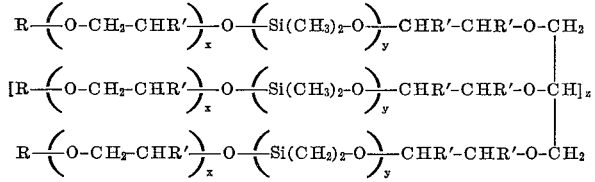

in which R is a monovalent lower alkyl radical having from 1 to 5 carbon atoms, R' and R" represent a member selected from the group consisting of hydrogen atoms and monovalent lower alkyl radicals having 1 to 5 carbon atoms, $x$ is a whole number greater than 3, $y$ is a whole number greater than 2, $z$ is a whole number of from 0 to 6 and $n$ is an integer of from 3 to 4.

2. The process of claim 1 wherein the group

—(O—CH$_2$—CR'H—)$_x$ is composed of oxypropylene and oxyethylene groupings.

3. The process of claim 1 wherein the organic compound having at least two reactive hydrogen atoms is a polyalkylene ether having at least two terminal alcoholic hydroxyl groups.

4. The process of claim 1 wherein the reaction mixture contains water as the blowing agent.

5. In the preparation of a polyurethane foam by a process wherein an organic polyisocyanate is reacted in a reaction mixture containing a blowing agent with an organic compound having at least two reactive hydrogen atoms which are reactive with an —NCO group, said organic compound having a molecular weight of at least about 500, the improvement which comprises affecting the said reaction while the components are in admixture with a compound having the formula:

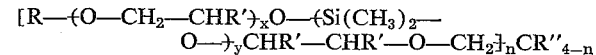

in which R is a monovalent lower alkyl radical having from 1 to 5 carbon atoms, R' and R" represent a member selected from the group consisting of hydrogen atoms and monovalent lower alkyl radicals having 1 to 5 carbon atoms, $x$ is a whole number greater than 3, $y$ is a whole number greater than 2, and $n$ is an integer of from 3 to 4.

6. In the preparation of a polyurethane foam by a process wherein an organic polyisocyanate is reacted in a reaction mixture containing a blowing agent with an organic compound having at least two reactive hydrogen atoms which are reactive with an —NCO group, said organic compound having a molecular weight of at least about 500, the improvement which comprises affecting the said reaction while the components are in admixture with a compound having the formula:

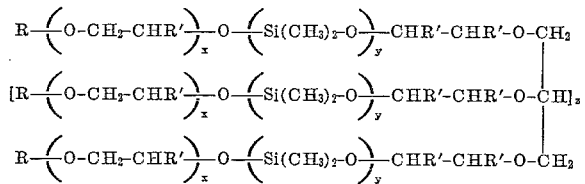

in which R is a monovalent lower alkyl radical having from 1 to 5 carbon atoms, R' and R" represent a member selected from the group consisting of hydrogen atoms and monovalent lower alkyl radicals having 1 to 5 carbon atoms, $x$ is a whole number greater than 3, $y$ is a whole number greater than 2 and $z$ is a whole number of from 0 to 6.

7. The process of claim 3 wherein the polyisocyanate is an isomeric mixture of 80% 2,4-toluylene diisocyanate and 20% 2,6-toluylene diisocyanate.

References Cited by the Examiner
UNITED STATES PATENTS 3,040,080   6/1962   Kopnick et al. _____ 260—448.8

FOREIGN PATENTS 1,212,252   10/1959   France.

LEON J. BERCOVITZ, *Primary Examiner.*